United States Patent
Tada et al.

(10) Patent No.: US 12,049,522 B2
(45) Date of Patent: Jul. 30, 2024

(54) POWDER CONTAINING CARBOXYMETHYLATED CELLULOSE NANOFIBERS

(71) Applicant: NIPPON PAPER INDUSTRIES CO., LTD., Tokyo (JP)

(72) Inventors: Yusuke Tada, Tokyo (JP); Kazuhiko Inoue, Tokyo (JP); Takeshi Nakatani, Tokyo (JP)

(73) Assignee: NIPPON PAPER INDUSTRIES CO., LTD., Tokyo (JP)

( * ) Notice: Subject to any disclaimer, the term of this patent is extended or adjusted under 35 U.S.C. 154(b) by 868 days.

(21) Appl. No.: 17/058,207

(22) PCT Filed: May 28, 2019

(86) PCT No.: PCT/JP2019/021083
§ 371 (c)(1),
(2) Date: Nov. 24, 2020

(87) PCT Pub. No.: WO2019/230716
PCT Pub. Date: Dec. 5, 2019

(65) Prior Publication Data
US 2021/0155717 A1 May 27, 2021

(30) Foreign Application Priority Data

May 29, 2018 (JP) .................... 2018-102619

(51) Int. Cl.
*C08B 11/12* (2006.01)
*C08J 3/12* (2006.01)
*C08L 1/28* (2006.01)

(52) U.S. Cl.
CPC ............ *C08B 11/12* (2013.01); *C08J 3/12* (2013.01); *C08L 1/286* (2013.01); *C08J 2301/28* (2013.01)

(58) Field of Classification Search
CPC ... C08B 11/12; C08L 1/286; C08J 3/12; C08J 2301/28

USPC ...................................... 106/172.1
See application file for complete search history.

(56) References Cited

U.S. PATENT DOCUMENTS

| 2007/0190017 A1 | 8/2007 | Yamasaki et al. |
| 2016/0333116 A1 | 11/2016 | Nakatani et al. |
| 2018/0265597 A1 | 9/2018 | Homma et al. |
| 2019/0055323 A1 | 2/2019 | Kakubari et al. |

FOREIGN PATENT DOCUMENTS

| JP | 10-251301 A | 9/1998 |
| JP | 10-251446 A | 9/1998 |
| JP | 2013-64134 A | 4/2013 |
| JP | 2015-134873 A | 7/2015 |
| JP | 2016-166258 A | 9/2016 |
| JP | 2017-057391 A | 3/2017 |
| JP | 2017-149901 A | 8/2017 |
| WO | WO-2005/073286 A1 | 8/2005 |
| WO | WO-2014/088072 A1 | 6/2014 |
| WO | WO-2015/107995 A1 | 7/2015 |
| WO | WO-2018/143149 A1 | 8/2018 |

OTHER PUBLICATIONS

Machine translation of JP 2017057391 A originally published Jun. 2014 to Homma et al. (Year: 2014).*
ChEBI: 41402—carboxymethyl group [online], [last modified Nov. 20, 2019]. Retrieved from the internet: < URL: https://www.ebi.ac.uk/chebi/searchId.do?chebiId=41402.> (Year: 2019).*
International Search Report and Written Opinion for Application No. PCT/JP2019/021083, dated Sep. 3, 2019, 9 pages.

* cited by examiner

*Primary Examiner* — Sheng H Davis
*Assistant Examiner* — Ritu S Shirali
(74) *Attorney, Agent, or Firm* — McCarter & English, LLP; Wei Song

(57) ABSTRACT

A powder that contains carboxymethylated cellulose nanofibers, said carboxymethylated cellulose nanofibers having a degree of carboxymethyl substitution of 0.50 or less and a cellulose type I crystallinity of 60% or more, and has a median diameter of 10.0 μm to 150.0 μm. This powder is suitable usable as an additive.

12 Claims, No Drawings

_US 12,049,522 B2_

POWDER CONTAINING CARBOXYMETHYLATED CELLULOSE NANOFIBERS

CROSS-REFERENCE TO RELATED APPLICATIONS

This application is a U.S. national stage filing, under 35 U.S.C. § 371(c), of International Application No. PCT/JP2019/021083, filed on May 28, 2019, which claims priority to Japanese Patent Application No. 2018-102619, filed on May 29, 2018.

TECHNICAL FIELD

The present invention relates to a powder containing carboxymethylated cellulose nanofibers. Specifically, the present invention relates to a powder containing carboxymethylated celluloses and controlled to have a particular range of a particle size, the carboxymethylated celluloses having particular ranges of a degree of carboxymethyl substitution and a degree of crystallization of cellulose I type.

BACKGROUND ART

Carboxymethylated celluloses are obtained by linking carboxymethyl groups to some of hydroxyl groups in glucose residues in the celluloses to form ether linkages. Carboxymethylated celluloses are used as various additives such as thickeners, caking agents, binders, water adsorbents, water retention materials, emulsion stabilizers, and the like in cosmetics, medicines, foods, various industrial products, and the like. Carboxymethylated celluloses are derived from natural celluloses and thus are environmentally friendly materials which have mild biodegradability and is also be able to subjected to waste incineration, and thus applications thereof are expected to be expanded hereafter.

A commonly known method for producing carboxymethylated cellulose is a method including subjecting cellulose to an alkaline treatment (mercerization) and then a treatment with an etherifying agent (also referred to as "carboxymethylation agent") (carboxymethylation, also called "etherification"). A method including performing both mercerization and carboxymethylation in water as a solvent, and a method including performing both mercerization and carboxymethylation in a solvent containing mainly an organic solvent (PTL 1) are known. The former is called "water mediated method" and the latter is called "solvent mediated method".

Increase in the amount of carboxymethyl groups in carboxymethylated celluloses (namely, increase in the degree of carboxymethyl substitution) allows carboxymethylated celluloses to be dissolved in water. On the other hand, if the degree of carboxymethyl substitution is adjusted in a proper range, carboxymethylated celluloses become able to maintain their fibrous shapes even in water. A carboxymethylated cellulose having a fibrous shape can be mechanically defibrated and thus converted into nanofibers having nanoscale fiber diameters (PTL 2).

CITATION LIST

Patent Literature

PTL 1: Japanese Patent Laid-Open No. 2017-149901
PTL 2: International Publication No. WO 2014/088072

SUMMARY OF INVENTION

Technical Problem

Carboxymethylated celluloses are used as additives in various fields of foods and drinks, cosmetics, aqueous paints, and the like because of their properties such as thickening properties, water absorption ability and water retention ability. Carboxymethylated cellulose nanofibers obtained by converting carboxymethylated celluloses into nanofibers are also expected to be used as additives in various fields.

An object of the present invention is to provide a powder which contains carboxymethylated cellulose nanofibers and is suitable for use as an additive.

Solution to Problem

The present inventors have made intensive studies to achieve the above object, and as a result, have found that a powder obtained by drying a dispersion of carboxymethylated cellulose nanofibers, pulverizing the resultant, and classifying the pulverized product so as to have a particular range of a particle size is favorable in workability, hardly forms a clump (aggregate) when added to water, and can be suitably used as any additive in various fields. It has also been found that a carboxymethylated cellulose obtained by performing mercerization (alkaline treatment of cellulose) in a solvent containing mainly water and thereafter carboxymethylation (also referred to as "etherification") in a mixed solvent of water and an organic solvent in production of carboxymethylated cellulose nanofibers not only can form a cellulose nanofiber dispersion very high in transparency by defibration, but also is high in a rate of effective utilization of a carboxymethylation agent, as compared with any carboxymethylated cellulose obtained according to a conventional water mediated method (method including performing both mercerization and carboxymethylation in water as a solvent) or a solvent mediated method (method including performing both mercerization and carboxymethylation in a solvent containing mainly an organic solvent).

The present invention provides the following, but is not limited thereto.
(1) A powder containing carboxymethylated cellulose nanofibers and having a median diameter of from 10.0 μm to 150.0 μm, wherein the carboxymethylated cellulose nanofibers have a degree of carboxymethyl substitution of 0.50 or less and a degree of crystallization of cellulose I type of 60% or more.
(2) The powder according to (1), wherein the carboxymethylated cellulose nanofibers exhibit a transmittance to light at a wavelength of 660 nm of 70% or more when the carboxymethylated cellulose nanofibers are dispersed in water to form a water dispersion having a solid content of 1% (w/v).
(3) The powder according to (1) or (2), wherein the powder has an angle of repose in the range from 30.0° to 60.0°.
(4) The powder according to any one of (1) to (3), including the carboxymethylated cellulose and 5% by mass to 300% by mass of a water-soluble polymer based on an absolute dry mass of the carboxymethylated cellulose nanofibers.
(5) The powder according to any one of (1) to (4), wherein the carboxymethylated cellulose nanofibers are produced by mercerizing a cellulose in a solvent containing mainly water to produce a mercerized cellulose, then carboxymethylating the mercerized cellulose in a mixed solvent of water and an organic solvent to produce a carboxymethylated cellulose, and then defibrating the carboxymethylated cellulose to provide the carboxymethylated cellulose nanofibers.

(6) The powder according to (5), wherein the solvent containing mainly water is a solvent containing more than 50% by mass of water.

(7) The powder according to any one of (1) to (6), wherein the carboxymethylated cellulose nanofibers have an average fiber diameter of from 3 nm to 500 nm.

Effects of Invention

The powder containing carboxymethylated cellulose nanofibers of the present invention has an appropriate range of a particle size, thus is favorable in workability, hardly forms a clump (aggregate) in water, is excellent in dispersion stability, is excellent in imparting of water retention and shape retention abilities, and is relatively non-sticky even when contacted with water. Therefore the powder can be suitably used as various additives such as an agent for imparting water retention ability, an agent for imparting shape retention ability, a viscosity modifier, an emulsion stabilizer, and a dispersion stabilizer, in various fields of foods, medicines, cosmetics, feeds, papermaking, paints, and the like.

DESCRIPTION OF EMBODIMENTS

Carboxymethylated Cellulose Nanofiber

The powder of the present invention contains carboxymethylated cellulose nanofibers having a degree of carboxymethyl substitution of 0.50 or less and a degree of crystallization of cellulose I type of 60% or more, and has a median diameter of 10.0 μm to 150.0 μm.

Carboxymethylated cellulose that is used to form the carboxymethylated cellulose nanofibers has a structure in which some of hydroxyl groups in glucose residues in the cellulose are linked to carboxymethyl groups to form ether linkages. The carboxymethylated cellulose nanofibers are a product obtained by converting the carboxymethylated cellulose having the above structure into nanofibers having nanoscale fiber diameters. The carboxymethylated cellulose may be in the form of a salt including a metal salt such as a sodium salt of a carboxymethylated cellulose. The carboxymethylated cellulose nanofibers may also be in the form of a salt.

The carboxymethylated cellulose nanofibers for use in the present invention maintain at least a portion of a fibrous shape, even when dispersed in water. Specifically, a fibrous substance can be found when a water dispersion of the carboxymethylated cellulose nanofibers are observed with an electron microscope, etc. A peak of a cellulose I type crystal is also exhibited in observation of the carboxymethylated cellulose nanofibers with X-ray diffraction.

In the carboxymethylated cellulose nanofibers for use in the present invention, as long as the effects of the present invention are not impaired, carboxyl groups (—COOH) derived from carboxymethyl groups may be modified as needed. Examples of such modification include hydrophobization by linking amine compounds or phosphorus compounds having an alkyl group, an aryl group, an aralkyl group, or the like to carboxyl groups.

The carboxymethylated cellulose nanofibers for use in the present invention may carry a metal, as long as the effects of the present invention are not impaired. Carrying a metal means that an aqueous solution containing a metal compound is brought into contact with the carboxymethylated cellulose nanofibers to result in formation of a coordinate bond or a hydrogen bond of the metal compound to carboxylate groups (—COO—) derived from carboxyl groups (—COOH). Thus, carboxymethylated cellulose nanofibers that contain a metal compound whose metal ion is ionically linked thereto can be obtained. Examples of such a metal compound include a metal salt including ions of one or more metal elements selected from the group consisting of Ag, Au, Pt, Pd, Mn, Fe, Ti, Al, Zn or Cu.

Degree of Carboxymethyl Substitution

The carboxymethylated cellulose nanofibers for use in the present invention have a degree of carboxymethyl substitution per anhydrous glucose unit of cellulose of 0.50 or less. It is considered that the carboxymethylated cellulose nanofibers dissolve in water to fail to maintain a fibrous shape in a case where the degree of carboxymethyl substitution is more than 0.50. The degree of substitution is preferably 0.02 to 0.50, further preferably 0.05 to 0.50, further preferably 0.10 to 0.40, further preferably 0.20 to 0.40 in consideration of operationability. By introducing carboxymethyl groups into celluloses, electrical repulsion of the celluloses occurs, and thus the resulting celluloses can be defibrated to nanofibers; however, when the degree of carboxymethyl substitution per anhydrous glucose unit is less than 0.02, defibration may be insufficient and thus cellulose nanofibers high in transparency may not be obtained. According to a conventional water mediated method, particularly in a degree of carboxymethyl substitution ranging from 0.20 to 0.40, it was difficult to obtain carboxymethylated cellulose nanofibers having a degree of crystallization of cellulose I type of 60% or more. The present inventors have found that carboxymethylated cellulose nanofibers having a degree of carboxymethyl substitution in the range from 0.20 to 0.40 and a degree of crystallization of cellulose I type of 60% or more can be obtained by, for example, a production method described below. The degree of carboxymethyl substitution can be adjusted by, for example, controlling the amount of a carboxymethylation agent to be added in a reaction, the amount of a mercerizing agent, and the compositional ratio between water and an organic solvent.

The anhydrous glucose unit in the present invention means individual anhydrous glucose (glucose residue) that forms cellulose. The degree of carboxymethyl substitution (also referred to as "degree of etherification") means the proportion of hydroxyl groups replaced with carboxymethyl ether groups among hydroxyl groups of the glucose residue that forms cellulose (the number of carboxymethyl ether groups per glucose residue). The degree of carboxymethyl substitution may be here abbreviated as DS.

The method for measuring the degree of carboxymethyl substitution is as follows:

About 2.0 g of a sample is precisely weighed and is put in a 300-mL stoppered conical flask. 100 mL of nitric acid/methanol (a liquid obtained by adding 100 mL of nitric acid (special grade) to 1000 mL of methanol) is added thereto and the resulting flask is shaken for 3 hours, thereby converting the salt of the carboxymethylated cellulose nanofibers (CMC) into H-CMC (hydrogen-type carboxymethylated cellulose nanofibers). 1.5 to 2.0 g of the absolute dry H-CMC is precisely weighed, and is put in a 300-mL stoppered conical flask. The H-CMC is wetted with 15 mL of 80% methanol. 100 mL of 0.1 N—NaOH is added thereto, and the resulting flask is shaken at room temperature for 3 hours. Phenolphthalein is used as an indicator to reversely titrate excess NaOH by 0.1 N—$H_2SO_4$, and the degree of carboxymethyl substitution (DS value) is calculated according to the following expressions.

$A=[(100×F'-0.1N—H_2SO_4(mL)×F)×0.1]/$(Absolute dry mass (g) of H-CMC)

Degree of carboxymethyl substitution$=0.162×A/(1-0.058×A)$

F': factor of 0.1 N—$H_2SO_4$
F: factor of 0.1 N—NaOH.

The degree of carboxymethyl substitution of the carboxymethylated cellulose nanofibers is generally the same as the degree of carboxymethyl substitution of the carboxymethylated cellulose before converted into the nanofibers.

Degree of Crystallization of Cellulose I Type

The degree of crystallization of cellulose in the carboxymethylated cellulose nanofibers for use in the present invention is 60% or more, preferably 65% or more, with respect to crystal I type. In a case where the degree of crystallization of cellulose I type is as high as 60% or more, the proportion of cellulose which maintains a crystal structure without dissolution in a solvent such as water is high, and thus the carboxymethylated cellulose nanofibers exhibit enhanced thixotropic properties (thixotropy), and is suitable for an application to viscosity modification, such as a thickener. Moreover, for example, this brings about an advantage that such nanofibers can impart an excellent ability to retain a shape to, for example, but is not limited thereto, a gel-like substance (for example, foods, cosmetics, and the like) when added thereto. The crystallinity of cellulose can be controlled by the concentration of a mercerizing agent and the temperature in treatment, as well as the degree of carboxymethylation. An alkali at a high concentration is used in mercerization and carboxymethylation to thereby allow a I type crystal of cellulose to be easily converted into a II type crystal; however, for example, the amount of the alkali (mercerizing agent) used can be adjusted to adjust the degree of denaturation, thereby allowing desired crystallinity to be maintained. The upper limit of the degree of crystallization of cellulose I type is not particularly limited. The upper limit is considered to be actually about 90%.

The method for measuring the degree of crystallization of cellulose I type of the carboxymethylated cellulose nanofibers is as follows:

A sample is placed on a glass cell, and subjected to measurement with an X-ray diffractometer (LabX XRD-6000, manufactured by Shimadzu Corporation). The degree of crystallization is calculated according to a procedure of Segal, et al., and is calculated from the diffraction intensity of the 002 plane at $2θ=22.6°$ and the diffraction intensity of an amorphous portion at $2θ=18.5°$ with the diffraction intensity at $2θ=10°$ to $30°$ as the baseline in an X-ray diffraction diagram, according to the following expressions.

$Xc=(I002c-Ia)/I002c×100$

Xc=degree (%) of crystallization of cellulose I type
I002c: diffraction intensity of 002 plane at $2θ=22.6°$
Ia: diffraction intensity of amorphous portion at $2θ=18.5°$.

The proportion of the I type crystal of the carboxymethylated cellulose nanofibers is generally the same as that of the carboxymethylated cellulose before converted into the nanofibers.

Median Diameter

The powder containing carboxymethylated cellulose nanofibers of the present invention has a median diameter in the range from 10.0 μm to 150.0 μm. The range of the median diameter is preferably from 30.0 μm to 130.0 μm, further preferably from 50.0 μm to 120.0 μm. In a case where the median diameter is less than 10.0 μm, the powder is generally too fine, workability becomes poor, and for example, the powder is easily scattered when handled. On the other hand, in a case where the median diameter is more than 150.0 μm, the powder is hardly dissolved or dispersed uniformly in a medium such as water, and tends to have a problem, such as the remaining of a clump (aggregate). The median diameter in the present invention means the value of the particle size ($D_{50}$) at a volume accumulation of 50% as measured using a laser diffraction/scattering particle size distribution analyzer when dispersed in methanol. Carboxymethylated cellulose nanofiber powder having such a median diameter can be obtained by pulverizing and classifying the carboxymethylated cellulose nanofibers according to, for example, a method described later.

Transparency in Water Dispersion

The carboxymethylated cellulose nanofibers for use in the present invention preferably exhibit a high transparency when dispersed in water as a dispersing medium to form a dispersion (water dispersion). Such nanofibers having high transparency can also be used as an additive of an application in which transparency is demanded. The transparency herein refers to the transmittance to light at a wavelength of 660 nm when the carboxymethylated cellulose nanofibers are dispersed in water to form a water dispersion having a solid content of 1% (w/v). The method for measuring the transparency of the carboxymethylated cellulose nanofibers is as follows:

A cellulose nanofiber dispersion (solid content: 1% (w/v), dispersing medium: water) is prepared, and the transmittance to light at 660 nm is measured with a square cell having a length of light path of 10 mm and UV-VIS spectrophotometer UV-1800 (manufactured by Shimadzu Corporation).

The transparency of the carboxymethylated cellulose nanofibers for use in the present invention is preferably 70% or more, more preferably 70% to 100%, further preferably 80% to 100%, further preferably 90% to 100%. Such cellulose nanofibers can be optimally used in an application in which transparency is demanded. Carboxymethylated cellulose nanofibers having the above degree of crystallization of cellulose I type and degree of carboxymethyl substitution and having such a transparency can be produced by, for example, a method described below.

Angle of Repose

The angle of repose of the powder containing carboxymethylated cellulose nanofibers of the present invention is preferably 30.0° or more, more preferably 35.0° or more, further preferably 37.0° or more, further preferably 40.0° or more. The angle of repose is preferably 60.0° or less, more preferably 56.0° or less, further preferably 53.0° or less. In a case where the angle of repose is 60.0° or less, the powder fluidity is favorable and workability is favorable. In a case where the angle of repose is 30.0° or more, powder scattering hardly occurs and workability is favorable.

The angle of repose of the powder of the present invention is the value of Angle Repose (angle of elevation) of a conical granular body, which is obtained, using Powder Tester (PT-N Model, manufactured by Hosokawa Micron Corporation), by dropping and depositing a powdery body through a funnel hole onto a horizontal plate having a certain area until a certain shape is obtained, thereby forming the conical granular body.

Collapse Angle

The collapse angle of the powder containing carboxymethylated cellulose nanofibers of the present invention is preferably 14.0° or more, more preferably 16.0° or more. The collapse angle is preferably 40.0° or less, more preferably 35.0° or less. In a case where the collapse angle is 40.0° or less, the powder fluidity is favorable and workability is favorable. In a case where the collapse angle is 20.0° or more, powder scattering hardly occurs and workability is favorable.

The collapse angle of the powder can be measured by the following method:

Using Powder Tester (PT-N Model, manufactured by Hosokawa Micron Corporation), a powdery body is dropped and deposited through a funnel hole onto a horizontal plate having a certain area until a certain shape is obtained, thereby forming a conical granular body. Next, a predetermined weight located on a seating on which the horizontal plate is placed is dropped to thereby apply a certain impact to the powdery body, and thus the powdery body partially flows naturally and is dropped out from a horizontal plate. Thereafter, for the remaining conical granular body, the angle of elevation from a point on the outer circumference of the bottom to the vertex of the cone is measured, and the result is defined as the collapse angle.

Angle of Difference

The difference between the angle of repose and the collapse angle refers to the angle of difference. The angle of difference serves as an indicator of ease of collapse of the powdery body due to vibration or the like from a conveyance apparatus such as a vibratory feeder, and it is indicated that, as the angle of difference is larger, the powdery body is more easily collapsed. The angle of difference is preferably 10.0° to 30.0°, more preferably 10.0° to 28.0°, further preferably 12.0° to 27.0°.

Fiber Diameter and Aspect Ratio

The carboxymethylated cellulose nanofibers for use in the present invention have nanoscale fiber diameters. The average fiber diameter is in the range of preferably 3 nm to 500 nm, further preferably 3 nm to 150 nm, further preferably 3 nm to 20 nm, further preferably 5 nm to 19 nm, further preferably 5 nm to 15 nm.

The aspect ratio of the carboxymethylated cellulose nanofibers is not particularly limited, and is preferably 350 or less, further preferably 300 or less, further preferably 200 or less, further preferably 120 or less, further preferably 100 or less, further preferably 80 or less. In a case where the aspect ratio is 350 or less, the fiber length is not too long and fiber entwining is thus decreased, thereby enabling the occurrence of an aggregate (clump) of the cellulose nanofibers to be reduced, and allowing the nanofibers to be suitable for use as an additive. A high fluidity is also achieved, and this brings about the advantages of ease of use even at a high concentration and ease of use even in an application in which a high solid content is demanded. The lower limit of the aspect ratio is not particularly limited, and is preferably 25 or more, further preferably 30 or more. In a case where the aspect ratio is 25 or more, the fibrous shape imparts the effect of enhancing thixotropic properties. The aspect ratio of the carboxymethylated cellulose nanofibers can be controlled by the mixing ratio between a solvent and water, the amount of chemical agents added, and the degree of carboxymethylation, in carboxymethylation. The carboxymethylated cellulose nanofibers having such an aspect ratio can also be produced by, for example, the method described later.

The average fiber diameter and the average fiber length of the carboxymethylated cellulose nanofibers can be each determined by analyzing 200 fibers randomly selected, with an atomic force microscope (AFM) in the case of a diameter of 20 nm or less or with a field emission scanning electron microscope (FE-SEM) in the case of a diameter of 20 nm or more, and calculating the average. The aspect ratio can be calculated according to the following expression:

Aspect ratio=Average fiber length/Average fiber diameter.

Viscosity and Thixotropic Properties in Water Dispersion

The carboxymethylated cellulose nanofibers for use in the present invention preferably exhibit high thixotropic properties when dispersed in water to form a dispersion (water dispersion). Thixotropic properties (thixotropy) refer to properties such that the viscosity gradually decreases when shear stress is applied to a material and also that viscosity gradually increases when the material stops, and the index of thixotropic properties herein is the value obtained by dividing the viscosity measured at a low shear speed by the viscosity measured at a high shear speed. Specifically, the viscosity and thixotropic properties are measured by the following methods:

A cellulose nanofiber dispersion (solid content 1% (w/v), dispersing medium: water) is prepared, left to still stand at 25° C. for 16 hours, and thereafter stirred using a stirring machine at 3000 rpm for 1 minute, to thereby provide a sample for viscosity measurement. A part of the resulting sample for viscosity measurement is subjected to measurement of the viscosity using a B-type viscometer (manufactured by Toki Sangyo Co., Ltd.) with a No. 4 rotor. The viscosity is measured at a rotational speed of 6 rpm after 3 minutes. Another part of the sample for viscosity measurement (which has not been subjected to measurement of the viscosity yet) are subjected to measurement of the viscosity using a B-type viscometer (manufactured by Toki Sangyo Co., Ltd.) with a No. 4 rotor. The viscosity is measured at a rotational speed of 60 rpm after 3 minutes. These measurements of the viscosity are made according to the method of JIS-Z-8803. The value obtained by dividing the viscosity at 6 rpm by the viscosity at 60 rpm is used as the index of thixotropic properties.

For the carboxymethylated cellulose nanofibers for use in the present invention, the value obtained by dividing the viscosity at 25° C. and 6 rpm of a water dispersion thereof having a solid content of 1% (w/v), by the viscosity at 25° C. and 60 rpm of a water dispersion thereof having a solid content of 1% (w/v) (also simply referred to as "the value obtained by dividing the viscosity at 6 rpm by the viscosity at 60 rpm") is preferably 6.0 or more. It is indicated that, as the value is higher, the viscosity is more highly changed depending on the difference in shear stress and also thixotropic properties are higher. Cellulose nanofibers high in thixotropic properties are suitable for use as an agent for imparting shape retention ability and a viscosity modifier.

The upper limit of the value obtained by dividing the viscosity at 6 rpm by the viscosity at 60 rpm is not limited, and the upper limit is considered to be actually about 15.0.

The viscosity at 6 rpm of the carboxymethylated cellulose nanofibers (water dispersion having a solid content of 1% (w/v), 25° C.) is preferably 15000 mPa·s or more, further preferably 20000 mPa·s or more. As the viscosity at a lower shear speed (6 rpm) is higher, thixotropic properties tends to be higher. The upper limit of the viscosity at 6 rpm is not particularly limited, and is considered to be actually about 50000 mPa·s.

The viscosity at 60 rpm of the carboxymethylated cellulose nanofibers (water dispersion having a solid content of 1% (w/v), 25° C.) is preferably about 1500 to 8400 mPa·s, further preferably about 2000 to 7000 mPa·s, further preferably about 2500 to 7000 mPa·s, further preferably about 3000 to 7000 mPa·s.

Carboxymethylated cellulose nanofibers having such viscosity and thixotropic properties can be produced by, for example, a method described below.

Method for Producing Carboxymethylated Cellulose Nanofibers

Carboxymethylated celluloses can be commonly produced by subjecting cellulose to an alkaline treatment (mercerization), and thereafter allowing the resulting mercerized cellulose (also referred to as "alkaline cellulose") to react with a carboxymethylation agent (also referred to as "etherifying agent"). For example, a carboxymethylated cellulose which can form nanofibers having a degree of carboxymethyl substitution of 0.50 or less and a degree of crystallization of cellulose I type of 60% or more and exhibiting a high transparency can be produced by performing mercerization (alkaline treatment of cellulose) in a solvent containing mainly water and thereafter carboxymethylation (also referred to as "etherification") in a mixed solvent of water and an organic solvent. The carboxymethylated cellulose thus obtained not only has a high rate of effective utilization of a carboxymethylation agent, but also can be defibrated to form a cellulose nanofiber dispersion having high transparency, as compared with carboxymethylated cellulose obtained according to a conventional water mediated method (method including performing both mercerization and carboxymethylation in water as a solvent) or solvent mediated method (method including performing both mercerization and carboxymethylation in a solvent containing mainly an organic solvent). Next, the cellulose nanofiber dispersion is dried (removal of the dispersing medium) and pulverized, and the resultant is classified, whereby a powder of the present invention, which contains carboxymethylated cellulose nanofibers and has a particle size within a particular range, can be produced.

A powder containing carboxymethylated cellulose nanofibers, thus obtained, is excellent in dispersion stability, is excellent in imparting of water retention ability and shape retention ability, is relatively non-sticky even when contacted with water, and hardly forms a clump in water, and thus, it is suitable for use as an additive. The above method has the advantage of a high rate of effective utilization of the carboxymethylation agent.

Cellulose

The cellulose in the present invention means polysaccharide having a structure in which D-glucopyranoses (D-glucopyranose is also simply referred to as "glucose residue" or "anhydrous glucose") are connected by β-1,4 linkages. Celluloses are commonly classified to, for example, native cellulose, regenerated cellulose, fine cellulose, and microcrystalline cellulose from which an amorphous region is removed, depending on the source, the production method, and the like. Any of such celluloses can be used as a raw material of the mercerized cellulose in the present invention, and cellulose high in degree of crystallization of cellulose I type is preferably used as a raw material in order that a degree of crystallization of cellulose I type of 60% or more is maintained in the carboxymethylated cellulose. The degree of crystallization of cellulose I type of the cellulose as a raw material is preferably 70% or more, further preferably 80% or more. The method for measuring the degree of crystallization of cellulose I type is as described above.

Examples of the native cellulose include bleached pulp and unbleached pulp (bleached wood pulp or unbleached wood pulp); linter and refined linter; and cellulose produced by microorganisms such as acetic acid bacteria. The raw material of the bleached pulp or unbleached pulp is not limited, and examples thereof include wood, cotton, straw, bamboo, hemp, jute, and kenaf. The method for producing the bleached pulp or unbleached pulp is also not particularly limited, and may be a mechanical method, a chemical method, or a combined intermediate method between these two methods. Examples of the bleached pulp or unbleached pulp classified according to the production method include mechanical pulp (thermomechanical pulp (TMP), groundwood pulp), chemical pulp (sulfite pulp such as needle (softwood) unbleached sulfite pulp (NUSP), and needle bleached sulfite pulp (NBSP), and kraft pulp such as needle unbleached kraft pulp (NUKP), needle bleached kraft pulp (NBKP), leaf (hardwood) unbleached kraft pulp (LUKP), and leaf bleached kraft pulp (LBKP)). Dissolving pulp may also be used, besides papermaking pulp. Dissolving pulp is pulp chemically refined, is mainly used in a dissolved state in chemicals, and serves as a main raw material of an artificial fiber, cellophane, or the like.

Examples of the regenerated cellulose include those obtained by dissolving cellulose in a solvent such as a cuprammonium solution, a cellulose xanthate solution, or a morpholine derivative, and anew subjecting the resultant to spinning. Examples of the fine cellulose include one obtained by subjecting a cellulose material such as the native cellulose or regenerated cellulose to a depolymerization treatment (for example, acid hydrolysis, alkali hydrolysis, enzymatic degradation, a blasting treatment, or a vibration ball mill treatment), and one obtained by mechanically treating the cellulose-based material.

Mercerization

The mercerized cellulose is obtained by using the above cellulose as a raw material and adding a mercerizing agent (alkali). The above carboxymethylated cellulose exhibiting a high transparency can be obtained in an economic manner by using mainly water as a solvent for such a mercerization reaction and using a mixed solvent of an organic solvent and water for the next carboxymethylation; however, the production method of the carboxymethylated cellulose nanofibers for use in the present invention is not limited thereto. Hereinafter, an example will be described where a solvent containing mainly water is used for mercerization.

"Using mainly water as a solvent (solvent containing mainly water)" refers to using a solvent containing water in an amount of 50% by mass or higher. The solvent containing mainly water preferably contains 55% by mass or more, more preferably 60% by mass or more, more preferably 70% by mass or more, more preferably 80% by mass or more, further preferably 90% by mass or more, further preferably 95% by mass or more of water. The solvent containing mainly water particularly preferably contains 100% by mass of water (namely, is water). As the proportion of water in mercerization is higher, an advantage that carboxymethyl groups are more uniformly introduced into celluloses is obtained. Examples of the solvent (which is mixed with water when use) other than water in the solvent containing mainly water include an organic solvent used as a solvent for carboxymethylation of the later stage. Examples can include alcohols such as methanol, ethanol, n-propyl alcohol, isopropyl alcohol, n-butanol, isobutanol, and tert-butanol, ketones such as acetone, diethyl ketone, and methyl ethyl ketone, and dioxane, diethyl ether, benzene and dichloromethane. These can be used singly or in the form of a mixture of two or more thereof, and be added to water in an amount of less than 50% by mass, as a solvent for mercerization. The solvent containing mainly water preferably contains 45% by mass or less, further preferably 40% by mass or less, further preferably 30% by mass or less, further preferably 20% by mass or less, further preferably 10% by mass or less, further preferably 5% by mass or less, more preferably 0% by mass of the organic solvent.

Examples of the mercerizing agent include alkali metal hydroxides such as lithium hydroxide, sodium hydroxide, and potassium hydroxide, and these can be used singly or in combinations of any two or more thereof. The mercerizing agent is not limited thereto. Such an alkali metal hydroxide can be added to a reactor, for example, in the form of an aqueous solution having a content of the alkali metal hydroxide of 1 to 60% by mass, preferably 2 to 45% by mass, more preferably 3 to 25% by mass.

The amount of the mercerizing agent used may be an amount such that the carboxymethylated cellulose can satisfy both a degree of carboxymethyl substitution of 0.50 or less and a degree of crystallization of cellulose I type of 50% or more, and is not particularly limited, and, in one embodiment, the amount thereof per 100 g of cellulose (absolute dry) is preferably 0.1 mol or more and 2.5 mol or less, more preferably 0.3 mol or more and 2.0 mol or less, further preferably 0.4 mol or more and 1.5 mol or less.

The amount of the solvent containing mainly water for mercerization is preferably an amount which enables a raw material to be stirred and mixed. Specifically, the amount is preferably, but is not limited to, 1.5 to 20 times, more preferably 2 to 10 times as large as that of cellulose as a raw material, in terms of mass. Such an amount enables a homogeneous reaction to occur.

A mercerization treatment is performed by mixing a raw material (cellulose) and the solvent containing mainly water, adjusting the temperature of a reactor to 0 to 70° C., preferably 10 to 60° C., more preferably 10 to 40° C., adding an aqueous solution of a mercerizing agent, and stirring the resultant for 15 minutes to 8 hours, preferably 30 minutes to 7 hours, more preferably 30 minutes to 3 hours. Thus, the mercerized cellulose is obtained.

The pH for mercerization is preferably 9 or more, and thus the mercerization reaction can progress. The pH is more preferably 11 or more, further preferably 12 or more, and may be 13 or more. The upper limit of the pH is not particularly limited.

Such mercerization can be performed by use of a reactor in which the above respective components can be mixed and stirred while controlling the temperature, and any of various reactor conventionally used for a mercerization reaction can be used. For example, a batch type stirred reactor in which two screws are used to stir and mix the components is preferable in view of uniform mixing ability and also productivity.

Carboxymethylation

The carboxymethylated cellulose is obtained by adding a carboxymethylation agent (also referred to as "etherifying agent") to the mercerized cellulose. The above carboxymethylated cellulose exhibiting a high transparency can be obtained in an economic manner by using a solvent containing mainly water for mercerization and a mixed solvent of water and an organic solvent for carboxymethylation; however, the production method of the carboxymethylated cellulose nanofibers for use in the present invention is not limited thereto. Hereinafter, an example will be described where a mixed solvent of water and an organic solvent is used for carboxymethylation.

Examples of the carboxymethylation agent include monochloroacetic acid, sodium monochloroacetate, methyl monochloroacetate, ethyl monochloroacetate, and isopropyl monochloroacetate. In particular, monochloroacetic acid or sodium monochloroacetate is preferable in terms of their availability.

The amount of the carboxymethylation agent used may be an amount such that the carboxymethylated cellulose can satisfy both a degree of carboxymethyl substitution of 0.50 or less and a degree of crystallization of cellulose I type of 50% or more, and is not particularly limited, and, in one embodiment, the carboxymethylation agent is preferably added in an amount ranging from 0.5 to 1.5 mol per anhydrous glucose unit of cellulose. The lower limit of the range is more preferably 0.6 mol or more, further preferably 0.7 mol or more, and the upper limit in the range is more preferably 1.3 mol or less, further preferably 1.1 mol or less. The carboxymethylation agent can be added to a reactor, for example, but not limited to, in the form of an aqueous solution having a content of the carboxymethylation agent of 5 to 80% by mass, more preferably 30 to 60% by mass, and can also be added in the form of a powder without any dissolution.

The molar ratio of the mercerizing agent to the carboxymethylation agent (mercerizing agent/carboxymethylation agent) generally adopted is 0.90 to 2.45 in a case where monochloroacetic acid or sodium monochloroacetate is used as the carboxymethylation agent. The reason for this is as follows: a molar ratio of less than 0.90 can cause a carboxymethylation reaction to insufficiently progress, resulting in remaining of the unreacted monochloroacetic acid or sodium monochloroacetate and thus diseconomy, and a molar ratio of more than 2.45 may cause a side reaction of an excess of the mercerizing agent with monochloroacetic acid or sodium monochloroacetate to progress, resulting in production of a glycolic acid alkali metal salt and thus diseconomy.

The rate of effective utilization of the carboxymethylation agent in carboxymethylation is preferably 15% or more, more preferably 20% or more, further preferably 25% or more, particularly preferably 30% or more. The rate of effective utilization of the carboxymethylation agent refers to the proportion of carboxymethyl groups introduced into cellulose to carboxymethyl groups in the carboxymethylation agent. The carboxymethylated cellulose in the present invention can be obtained at a high rate of effective utilization of the carboxymethylation agent (namely, in an economic manner without use of large amount of the carboxymethylation agent), by use of a solvent containing mainly water for mercerization and a mixed solvent of water and an organic solvent for carboxymethylation. The upper limit of the rate of effective utilization of the carboxymethylation agent is not particularly limited, and the upper limit is actually about 80%. The rate of effective utilization of the carboxymethylation agent may be herein abbreviated as AM.

The method for calculating the rate of effective utilization of the carboxymethylation agent is as follows:

$$AM = (DS \times \text{Number of moles of cellulose})/\text{Number of moles of carboxymethylation agent}$$

DS: Degree of carboxymethyl substitution

Number of moles of cellulose: Mass of pulp (Dry mass after drying at 100° C. for 60 minutes)/162

(162 means the molecular weight per glucose unit of cellulose).

The concentration of the cellulose material in the carboxymethylation reaction is not particularly limited, and is preferably 1 to 40% (w/v) in view of an enhancement in rate of effective utilization of the carboxymethylation agent.

The carboxymethylation reaction is allowed to progress in a mixed solvent of water and an organic solvent, the mixed solvent being formed by appropriately adding an organic solvent or an aqueous solution of an organic solvent to the reactor, or alternatively, appropriately reducing the organic solvent or the like other than water for the mercerization treatment, for example, under reduced pressure, at the same time as of addition of the carboxymethylation agent or before or immediately after addition of the carboxymethylation agent, to thereby form the mixed solvent of water and an organic solvent. The timing of addition or reduction of the organic solvent is not particularly limited as long as it is within the time from completion of the mercerization reaction to the time immediately after addition of the carboxymethylation agent, and is preferably, for example, within 30 minutes before or after addition of the carboxymethylation agent.

Examples of the organic solvent include alcohols such as methanol, ethanol, n-propyl alcohol, isopropyl alcohol, n-butanol, isobutanol, and tert-butanol, ketones such as acetone, diethyl ketone, and methyl ethyl ketone, and dioxane, diethyl ether, benzene and dichloromethane. These can be used singly or in the form of a mixture of two or more thereof, and be added to water as a solvent for carboxymethylation. In particular, a monohydric alcohol having 1 to 4 carbon atoms is preferable, and a monohydric alcohol having 1 to 3 carbon atoms is further preferable, because compatibility with water is excellent.

The content of the organic solvent in the mixed solvent for carboxymethylation is preferably 20% by mass or more, more preferably 30% by mass or more, further preferably 40% by mass or more, further preferably 45% by mass or more, particularly preferably 50% by mass or more based on the total of water and the organic solvent. A higher content of the organic solvent brings about the advantage of, for example, uniform substitution of carboxymethyl groups to easily occur, which results in a homogeneous carboxymethylated cellulose having stable quality to be obtained. The upper limit of the content of the organic solvent is not limited, and may be, for example, 99% by mass or less. The upper limit is preferably 90% by mass or less, further preferably 85% by mass or less, further preferably 80% by mass or less, further preferably 70% by mass or less in consideration of the cost of the organic solvent added.

The reaction medium (the mixed solvent of water and the organic solvent, containing no cellulose) for carboxymethylation preferably has a lower water content (in other words, a higher organic solvent content) than the reaction medium for mercerization. When this range is satisfied, the degree of crystallization of the resulting carboxymethylated cellulose can be easily maintained and the carboxymethylated cellulose in the present invention can be more efficiently obtained. In a case where the reaction medium for carboxymethylation has a lower water content (a higher organic solvent content) than the reaction medium for mercerization, the mixed solvent for the carboxymethylation reaction can be advantageously formed by a simple procedure in which a desired amount of the organic solvent is added to the reaction system after completion of the mercerization reaction, in transferring from the mercerization reaction to the carboxymethylation reaction.

The mixed solvent of water and an organic solvent is thus formed, the carboxymethylation agent is added to the mercerized cellulose, and then the resultant is stirred for about 15 minutes to 4 hours, preferably about 15 minutes to 1 hour while the temperature is preferably kept constantly in the range from 10 to 40° C. Mixing of a liquid containing the mercerized cellulose with the carboxymethylation agent is preferably performed by adding the carboxymethylation agent in portions or dropwise, in view of preventing the reaction mixture from being at a high temperature. After the carboxymethylation agent is added, the resulting mixture was stirred for a certain time, and the temperature thereof is raised, if necessary. An etherification (carboxymethylation) reaction is then performed at a reaction temperature of 30 to 90° C., preferably 40 to 90° C., further preferably 60 to 80° C. for 30 minutes to 10 hours, preferably 1 hour to 4 hours, thereby obtaining the carboxymethylated cellulose. Such a temperature rise in the carboxymethylation reaction brings about the advantage of an etherification reaction to be efficiently performed in a short time.

For carboxymethylation, the reactor which has been used for mercerization may be used as it is, or another reactor in which the components can be mixed and stirred while controlling the temperature may be used.

After completion of the reaction, the remaining alkali metal salt may be neutralized with a mineral acid or organic acid. If necessary, an inorganic salt, an organic acid salt, and others as by-product(s) may be removed by washing with water-containing methanol, and the resultant may be dried, pulverized and classified to form the carboxymethylated cellulose or the salt thereof. For removal of by-product(s), the carboxymethylated cellulose may be converted into an acid form before the washing, and the acid form may be returned to a salt form after the washing. Examples of an apparatus for use in dry pulverization include impact mills such as a hammer mill and a pin mill, medium mills such as a ball mill and a tower mill, and jet mills. Examples of an apparatus for use in wet pulverization include apparatuses such as a homogenizer, a masscolloider, and a pearl mill.

While the reason why the above method can provide a carboxymethylated cellulose which can be used to form a cellulose nanofiber dispersion having high transparency is not clear, the present inventors have confirmed that the above method enables maintaining a relatively high degree of crystallization of cellulose I type and therefore enables maintaining a fibrous shape of the carboxymethylated cellulose even at a relatively higher degree of carboxymethyl substitution. It is considered that a high degree of carboxymethyl substitution (namely, introduction of many carboxylmethyl groups) with the fibrous shape being maintained leads to an enhancement in defibrating properties of carboxymethylated cellulose in subsequent defibration, and this is probably one reason why a nanofiber dispersion high in transparency is obtained. However, the reason is not limited thereto.

Defibration into Nanofiber

A carboxymethylated cellulose can be converted by defibration into cellulose nanofibers having nanoscale fiber diameters.

Before defibration, a dispersion of the carboxymethylated cellulose is prepared. A dispersing medium is preferably water in terms of ease of handling. The concentration of the carboxymethylated cellulose in the dispersion in defibration is preferably 0.01 to 10% (w/v) in consideration of defibration and dispersing efficiencies.

The apparatus for use in defibration of the carboxymethylated cellulose is not particularly limited, and, for example, a high-speed rotation type, colloid mill type, high pressure type, roll mill type, or ultrasound type apparatus can be used. It is preferable to apply a strong shear force to the dispersion of the carboxymethylated cellulose in defibration. Particularly, it is preferable for efficient defibration to use a wet high-pressure or ultra-high-pressure homogenizer which can apply a pressure of 50 MPa or more to the dispersion and can apply a strong shear force. The pressure is more preferably 100 MPa or more, further preferably 140 MPa or more. If necessary, the dispersion may be subjected to a pre-treatment with known mixing, stirring, emulsifying, and/or dispersing apparatus(es), such as a high-speed shear mixer, prior to a defibration and dispersing treatment by a high-pressure homogenizer.

The high-pressure homogenizer is an apparatus which performs emulsifying, dispersing, defibrating, pulverizing, and ultra-fining with total energy of collision of particles and a shear force due to the difference in pressure by subjecting a fluid to pressurizing (high pressure) by a pump and thus ejecting the fluid through a very fine gap provided in a passage.

Powderization

A powder containing carboxymethylated cellulose nanofibers is obtained by drying a dispersion of carboxymethylated cellulose nanofibers (removal of the dispersing medium from the dispersion), pulverizing the resultant, and classifying the pulverize product.

The powder containing carboxymethylated cellulose nanofibers of the present invention may include, if necessary, any other component. For example, it is preferable to allow a water-soluble polymer to co-exist in the dispersion of the carboxymethylated cellulose nanofibers before drying the dispersion because of an enhancement in re-dispersibility. While the reason for an enhancement in re-dispersibility due to the water-soluble polymer is not clear, it is probably because a water-soluble polymer covers a portion of a surface of carboxymethylated cellulose nanofibers. the surface having a small charge density, to thereby inhibit formation of hydrogen bonds, which prevents nanofiber aggregation in drying. The powder of the present invention is particularly preferably a powder containing the carboxymethylated cellulose nanofibers and the water-soluble polymer.

Water-Soluble Polymer

Examples of the water-soluble polymer which may be added to the powder include cellulose derivatives (carboxymethylcellulose, methylcellulose, hydroxypropylcellulose, and ethylcellulose), xanthan gum, xyloglucan, dextrin, dextran, carrageenan, Locust bean gum, alginic acid, alginate, pullulan, starch, potato starch, kudzu starch, modified starch (cationized starch, monostarch phosphate, distarch phosphate, monophosphated distarch phosphate, hydroxypropyl starch, hydroxypropyl distarch phosphate, acetylated distarch adipate, acetylated distarch phosphate, acetylated oxidized starch, sodium starch octenylsuccinate, starch acetate, and oxidized starch), corn starch, gum arabic, Locust bean gum, gellan gum, polydextrose, pectin, chitin, water-soluble chitin, chitosan, casein, albumin, soy protein lysate, peptone, polyvinyl alcohol, polyacrylamide, sodium polyacrylate, polyvinylpyrrolidone, polyvinyl acetate, polyamino acid, polylactic acid, polymalic acid, polyglycerin, latex, a rosin-based sizing agent, a petroleum resin-based sizing agent, a urea resin, a melamine resin, an epoxy resin, a polyamide resin, a polyamide/polyamine resin, polyethyleneimine, polyamine, plant gum, polyethylene oxide, a hydrophilic crosslinked polymer, polyacrylic acid salt, a starch/polyacrylic acid copolymer, tamarind gum, gellan gum and colloidal silica, and any mixture of one or more thereof. Among them, cellulose derivatives are preferable in terms of affinity with the carboxymethylated cellulose nanofibers, and carboxymethylcellulose and a salt thereof are particularly preferable. It is considered that a water-soluble polymer, like carboxymethylcellulose and a salt thereof, penetrates between such carboxymethylated cellulose nanofibers and extends the distance between the nanofibers, resulting in an enhancement in re-dispersibility.

In a case where carboxymethylcellulose or a salt thereof is used as the water-soluble polymer, carboxymethylcellulose here used preferably has a degree of carboxymethyl substitution per anhydrous glucose unit, of 0.55 to 1.60, more preferably 0.55 to 1.10, further preferably 0.65 to 1.10. A longer molecule (higher viscosity) is more preferable because the effect of extending the distance between the nanofibers is higher. The B type viscosity at 25° C. and 60 rpm of an aqueous solution of containing 1% by mass of carboxymethylcellulose is preferably 3 mPa·s to 14000 mPa·s, more preferably 7 mPa·s to 14000 mPa·s, further preferably 1000 mPa·s to 8000 mPa·s. The "carboxymethylcellulose or a salt thereof" here mentioned as the water-soluble polymer is completely dissolved in water, and is thus distinguished from the above-described carboxymethylated cellulose nanofibers whose fibrous shape can be maintained in water.

The amount of the water-soluble polymer added is preferably 5% by mass to 300% by mass, further preferably 20% by mass to 300% by mass, further preferably 25% by mass to 250% by mass, further preferably 25% by mass to 200% by mass, further preferably 25% by mass to 60% by mass, based on the mass of the carboxymethylated cellulose nanofibers (absolute dry mass). When the water-soluble polymer is added in an amount of 5% by mass or more, the effect of enhancing re-dispersibility can be obtained. On the other hand, when the amount of the water-soluble polymer added is more than 300% by mass, the characteristics of the carboxymethylated cellulose nanofibers, such as viscosity characteristics including thixotropic properties and dispersion stability, may deteriorate. A case where the amount of the water-soluble polymer added is 25% by mass or more is preferable because particularly excellent re-dispersibility can be obtained. The amount is preferably 200% by mass or less, particularly preferably 60% by mass or less in consideration of thixotropic properties.

Drying

The dispersion of the carboxymethylated cellulose nanofibers, or a dispersion of the carboxymethylated cellulose nanofibers optionally including the water-soluble polymer mixed, is dried (removal of the dispersing medium), thereby obtaining a dried solid including the carboxymethylated cellulose nanofibers. Such drying is preferably made after adjustment of the pH of the dispersion to 9 to 11 because re-dispersibility is more favorable.

The drying method may be a known method, and is not particularly limited. Examples include spray drying, pressing, air drying, hot air drying, and vacuum drying. The dryer is not particularly limited, and a continuous tunnel dryer, a band dryer, a vertical dryer, a vertical turbo dryer, a multistage disk dryer, an aeration dryer, a rotary dryer, an air flow dryer, a spray dryer apparatus, a spray dryer, a cylindrical dryer, a drum dryer, a belt dryer, a screw conveyor dryer, a rotary dryer with a heating tube, a vibration transport dryer, a batch-type box dryer, an aeration dryer, a vacuum box type dryer, a stirring dryer, and the like can be used singly or in combinations of two or more thereof.

Among them, a dryer which forms a thin film to perform drying is preferably used in view of energy efficiency because heat energy can be directly supplied uniformly to an object to be dried to thereby perform a drying treatment more efficiently in a short time. A dryer which forms a thin film to perform drying is also preferable because a dried product can be immediately recovered by a simple procedure such as scraping of a thin film. It has also been found that, in a case where a thin film is formed and then dried, re-dispersibility is further enhanced. Examples of an dryer which forms a thin film and then performs drying include a drum dryer and a belt dryer, which form a thin film on a drum or a belt by a blade, a die, or the like, and then dry it. When a thin film is formed and dried, the thickness of the thin film is preferably 50 μm to 1000 μm, further preferably 100 μm to 300 μm. A thickness of 50 μm or more allows for easy scraping after drying, and a thickness of 1000 μm or less allows for a further enhancement of the effect of re-dispersibility.

The amount of moisture remaining after drying is preferably 2% by mass to 15% by mass based on the entire dried product.

Pulverization

The pulverization method is not particularly limited, and known methods can be used. Examples include a dry pulverization method including performing pulverization in the form of a powdery body, and a wet pulverization method including performing pulverization in the form of a solution or a dispersed liquid. In a case where wet pulverization is performed, such pulverization may be performed before the above drying.

Examples of the apparatus for use in the dry pulverization method include, but not limited to, a cutting mill, an impact type mill, an air flow type mill, and a medium mill. These can be used singly or in combination, or the same type of such mills can be used at several stages. Among them, an air flow type mill is preferable. Examples of the cutting mill include a mesh mill (manufactured by HORAI Co, Ltd.), Atoms™ (manufactured by Yamamoto Hyakuma Mfg. Co., Ltd.), a knife mill (manufactured by Pallmann), a granulator (manufactured by Herbold Meckesheim GmbH), and a rotary cutter mill (manufactured by Nara Machinery Co., Ltd.). Examples of the impact type mill include a pulverizer (manufactured by Hosokawa Micron Corporation), a fine impact mill (manufactured by Hosokawa Micron Corporation), a super micron mill (manufactured by Hosokawa Micron Corporation), a sample mill (manufactured by Seishin Enterprise Co., Ltd.), a bantam mill (manufactured by Seishin Enterprise Co., Ltd.), an atomizer (manufactured by Seishin Enterprise Co., Ltd.), a Tornado mill (manufactured by Nikkiso Co., Ltd.), a turbo mill (manufactured by Turbo Kogyo Co., Ltd. (Freund-Turbo Corporation)), and a bevel impactor (Aikawa Iron Works Co., Ltd.). Examples of the air flow type mill include a CGS-type jet mill (manufactured by Mitsui Mining Co., Ltd.), a jet mill (manufactured by Sansho Industry Co., Ltd.), EBARA jet micronizer (manufactured by Ebara Corporation), Ceren-Miller™ (manufactured by Masuko Sangyo Co., Ltd.), and an ultrasonic jet mill (manufactured by Nippon Pneumatic Mfg. Co., Ltd.). Examples of the medium mill include a vibration ball mill. Examples of the apparatus for use in the wet pulverization method include Mass Colloider (manufactured by Masuko Sangyo Co., Ltd.), a high-pressure homogenizer (manufactured by Sanmaru Machinery Co., Ltd.), and a medium mill. Examples of the medium mill can include a bead mill (manufactured by Aimex Co., Ltd.).

Classification

The carboxymethylated cellulose nanofibers after pulverization are classified for controlling to have a particular range of a particle size. The classification method is not particularly limited, and can be performed by allowing the carboxymethylated cellulose nanofibers to pass through a mesh (sieve) having a predetermined aperture. A usable sieve preferably has 20 to 400 meshes, further preferably 40 to 300 meshes, further preferably 60 to 200 meshes, and may also be used in a multistage manner. The median diameter of a powder finally obtained is 10.0 μm to 150.0 μm, preferably 30.0 μm to 130.0 μm, further preferably 50.0 μm to 120.0 μm.

Additive

The powder containing carboxymethylated cellulose nanofibers of the present invention can be suitably used as various additives such as an agent for imparting water retention ability, an agent for imparting shape retention ability, a viscosity modifier, an emulsion stabilizer, and a dispersion stabilizer in various fields, for example, foods, medicines, cosmetics, feeds, papermaking, and paints because of being excellent in dispersion stability and excellent in imparting of water retention ability and shape retention ability, and hardly forming a clump (aggregate) in water.

The powder is also effective as a gelling agent because it is excellent in mixing ability with other materials, is dispersed in water or a hydrophilic organic solvent to thereby exhibit thixotropic properties, and can be used to form a gel depending on the conditions. When the powder is used to form a film according to a papermaking method or a casting method, a material can be obtained which is high in strength and excellent in heat resistance and which has low thermal expansion ability. Such a film thus obtained is also useful as a coating layer for the purpose of imparting hydrophilicity. When combined with other materials such as a resin, the powder is excellent in dispersibility in the other materials, and it can be used to suitably provide a composite excellent in transparency. The powder also serves as a reinforcing filler, and, in the case a network of the fibers in a composite is formed at a high level, the product exhibits higher strength than a single resin and has a low rate of thermal expansion. Further, the powder has amphiphilicity, and thus serves as an emulsifier or a dispersion stabilizer. The powder is also effective as a metal ion collector because carboxymethyl groups form counter ions to metal ions.

The field in which the carboxymethylated cellulose nanofibers is used is not limited, and the carboxymethylated cellulose nanofibers can be used as a thickener, a gelling agent, a pasting agent, a food additive, an excipient, an additive for paints, an additive for adhesives, an additive for papermaking, a polishing agent, a compounding material for rubber or plastics, an agent for imparting water retention ability, an agent for imparting shape retention ability, a viscosity modifier, an emulsion stabilizer, a foam stabilizer, a dispersion stabilizer, a mud adjuster, a filtration aid, a mud overflow inhibitor, or the like in various fields in which an additive is generally used, for example, cosmetics, foods, beverages, medicines, papermaking, various chemical goods, paints, inks, sprays, feeds, agricultural chemicals, glaze, civil engineering, architecture, electronic materials, flame retardants, household products, adhesives, detergents, aromatic substances, and lubricant compositions.

For example, the powder containing carboxymethylated cellulose nanofibers of the present invention can be used as an additive for members of various batteries such as a manganese dry cell battery, an alkaline manganese battery, a silver oxide battery, a lithium battery, a lead storage battery, a nickel-cadmium storage battery, a nickel-hydrogen storage battery, a nickel-zinc storage battery, a silver oxide-zinc storage battery, a lithium ion battery, a lithium polymer battery, various gel electrolyte batteries, a solid-state battery, a zinc-air storage battery, an iron-air storage battery, an aluminum-air storage battery, a fuel cell battery, a solar battery, a sodium-sulfur battery, a polyacene battery, an electrolytic capacitor, and an electric double layer capacitor, and examples of such a member include a current collector and an active material of each electrode including a positive electrode and a negative electrode, an insulating film (separator), and an electrolyte film. The powder is also effective as a binding agent for a current collector and an active material of each electrode, a binding agent for such active materials, a dispersant for each active material, a dispersant for a solid electrolyte, or the like.

In a case where the powder containing carboxymethylated cellulose nanofibers of the present invention are used as an additive for cosmetics, it can be used as for example, but not limited to, an agent for imparting water retention ability, an agent for imparting shape retention ability, a viscosity modifier, an emulsion stabilizer, a texture improver, a foam stabilizer, or a dispersion stabilizer for cosmetics. Examples of such cosmetics include skin care articles such as a lotion, a serum, a milky lotion, a moisture cream, an all-in-one gel, a perfume, a cleansing foam, a foam agent, a cleansing preparation, a pack, sunscreen, a massage product, a skin-whitening cosmetic, an anti-aging product, and a cosmetic mask; makeup products such as a foundation, lip rouge, an eyebrow cosmetic, mascara, an eyeliner, eyeshadow, manicure, nail care, a face powder, a lip cream, lip gloss, a lip liner, a blush, a BB cream, and concealer; hair care products such as a shampoo, a hair color, a conditioner, a hair spray, a liquid hair dressing, a hair cream, hair wax, a hair gel, a set lotion, a scalp care cosmetic, a lash care cosmetic, a brow care cosmetic, a permanent wave agent, a hair dye liquid, a hair dye cream, and a hair grower; and body care product such as a body cream, a hand cream, a body shampoo, soap, a shaving cream, and a shaving lotion. These include not only oil, liquid, wax, stick, powder, and sheet-shaped products, but also may be an aerosolized product together with a propellant such as liquefied petroleum gas or the like.

For example, the powder of the present invention is compounded as an additive to a powdery makeup product such as a foundation, an eyebrow cosmetic, or mascara, thereby obtaining the effect of enhancing dispersibility of a pigment and preventing a clump, the effect of imparting the shape retention ability or thixotropic properties and thus enhancing coatability, fixability and glossy feeling, and the like.

For example, the powder of the present invention is compounded as an additive to a creamy, liquid, or gel-like cosmetic such as a BB cream, a moisture cream, a hair cream, a liquid hair dressing, a hair gel, or hair wax, thereby obtaining effects, for example, an enhancement in dispersibility of a powdery material, such as a pigment, an enhancement in emulsifying ability of a liquid raw material, an enhancement in coatability due to its thixotropic properties, an enhancement in and sustainment of styling properties due to its shape retention ability and thixotropic properties, and enhancements in flexibility and glossy feeling.

For example, the powder of the present invention is compounded as an additive to any cosmetic used in the form of foam, such as a shampoo, soap, a body shampoo, face-wash, or a foam agent, thereby obtaining effects, for example, an enhancement in foam stability due to its shape retention ability, and enhancements in and sustainment of slippery feeling and moist feeling of the skin after washing of foam.

For example, the powder of the present invention is compounded as an additive to a cosmetic which is expected to impart the ability to retain moisture, thus obtaining a high moisture-retaining effect due to the water retention ability of the carboxymethylated cellulose nanofibers.

For example, the powder of the present invention can be used as an additive to a mist-type lotion, thereby obtaining the effect of easily spraying due to its thixotropic properties.

For example, the powder of the present invention can be used as an additive to a cosmetic pack, thereby obtaining the effect of hardly dripping after applying to the skin and thus easily using due to its thixotropic properties and the shape retention ability.

In a case where the powder of the present invention is used as an additive for foods, examples include, but not limited to, an agent for imparting water retention ability, an agent for imparting shape retention ability, a viscosity modifier, an emulsion stabilizer, an eat-feeling improving agent, a foam stabilizer and a dispersion stabilizer for foods. Examples of foods to which the powder can be added include, but not limited to, beverages (cocoa, fiber/pulp-containing juices, sweet red-bean soup, amazake, lactic acid bacteria beverage, fruit milk, cold beverage, carbonated beverage, alcohol beverage, and the like), soups (corn soup, ramen soup, miso soup, consomme, and the like), sauces, dressing, ketchup, mayonnaise, jam, yogurt, whip cream, dry foods (dry processed food, instant noodle, pasta noodle, and the like), gluten-free pasta, ice cream, monaka (bean-jam-filled wafers), sherbet, juice in a stick-shaped polyethylene pack, confectionery (gummi candy, soft candy, jelly, cookie, and the like), dysphagia diets (thickening agent and gel-like foods such as administration-assisting jelly), oblate, agar, tokoroten (gelidium jelly), pullulan, starch syrup, merengue, breads (sweet bun, custard cream bread, and the like), gluten-free bread, filling, pancake, paste, frozen foods, meat processed foods, fish processed foods, processed rice products (rice cake, rice crackers, cubic rice crackers), and edible films.

In a case where the powder of the present invention is used as an additive for medicines or quasi-drugs, examples include, but not limited to, an agent for imparting water retention ability, an agent for imparting shape retention ability, a viscosity modifier, an emulsion stabilizer and a dispersion stabilizer for medicines. Examples of such medicines or quasi-drugs include, but not limited to, a tablet, an ointment, an adhesive tape, a poultice, a hand cream, a toothpaste, cosmeceutical, a hair agent, a medical toothpaste, a bath agent, a pesticide, a rodenticide, an osmidrosis-preventing agent, a disinfectant solution for soft contact lens, a mouth freshener, a hair grower, a depilatory, a hair dye, a decoloring/destaining agent, and a permanent wave agent.

In a case where the powder of the present invention is used as an additive for feeds, examples include, but not limited to, an agent for imparting water retention ability, an agent for imparting shape retention ability, a viscosity modifier, an emulsion stabilizer and a dispersion stabilizer for feeds. Examples of such feeds include a moist pellet and an expansion pellet for domestic animals or cultured fishes, and a milk substitute for cattle.

In a case where the powder of the present invention is used as an additive for papermaking, examples include, but not limited to, an agent for imparting water retention ability, an agent for imparting shape retention ability, a viscosity modifier, an emulsion stabilizer and a dispersion stabilizer for papermaking. For example, the powder can be used as an additive for a sizing agent, a retention aid, a paper strengthening agent, a coating agent, an agent for imparting barrier properties, or an agent for a bulky paper.

In a case where the powder of the present invention is used as an additive for paints, examples include, but not limited to, an agent for imparting water retention ability, an agent for imparting shape retention ability, a viscosity modifier, an emulsion stabilizer and a dispersion stabilizer for paints. Examples of such paints include a clear type paint, a matte paint, a paint for building, a Japanese lacquer, a craftwork paint, and an automobile interior paint.

The powder can also be used in others, for example, a dispersion stabilizer or a reinforcement material in daily necessities such as a detergent, a softener, cling wrap, a film, wet wipes, and a bath additive; filtration (moisture removal) of an edible oil or various solvents; a reinforcement material of a building material such as a fiber wall, a wall material, a roof material, concrete, mortar, ceramic, ceramic engineering, a sand wall, or a gypsum board; a civil engineering material such as foam shielding or a water sealant for a continuous wall; a resin filler, a compound or a reinforcement material for, for example, foamed polystyrene, a biodegradable resin, rubber, ceramic, or vinyl chloride; a dispersant for dispersing, for example, fine particle carbon black, barium sulfate (X-ray contrast agent), titanium oxide, or zing oxide; a moisture absorbent aid for an improvement in shape retention ability in moisture absorption of, for example, a deliquescent agent such as calcium chloride; a modifier for fibers (cloth, yarn); a liquid carrier; a lubricating oil; ceramic engineering; cat sand; a water absorption material for a desiccant; a greening construction; a binder; a pet supply; a sanitary article; wallpaper; and a culture medium.

When the powder of the present invention is used as an additive in various applications, a pH modifier, a preservative agent, a rust inhibitor, a surfactant, a binding material, an adhesive, a foaming agent, an excipient, a coupling agent, a pressure-sensitive adhesive, a dispersant, an adhesive, a lubricant, a release agent, a viscosity modifier, an emulsion stabilizer, a lubricating agent, a polishing agent, a colorant, or the like may be mixed and used as long as effects are not impaired.

EXAMPLES

Hereinafter, the present invention will be more specifically described with reference to Examples and Comparative Examples, but the present invention is not intended to be limited thereto. Unless particularly noted, "part(s)" and "%" represent "part(s) by mass" and "% by mass".

Example 1

To a twin-screw kneader whose rotational speed was modulated to 150 rpm, were added 130 parts of water and a solution obtained by dissolving 20 parts of sodium hydroxide in 10 parts of water and 90 parts of IPA, and leaf pulp (manufactured by Nippon Paper Industries Co., Ltd., LBKP) was added thereto in an amount of 100 parts in terms of dry mass when dried at 100° C. for 60 minutes. The resultant was stirred and mixed at 35° C. for 80 minutes, to prepare mercerized cellulose. Furthermore, 230 parts of isopropanol (IPA) and 60 parts of sodium monochloroacetate were added thereto while stirring. The resultant was stirred for 30 minutes, and the temperature was raised to 70° C. to allow a carboxymethylation reaction to occur for 90 minutes. After completion of the reaction, the resultant was subjected to neutralization to a pH of about 7 with acetic acid, washing with water-containing methanol, liquid removal, and drying, and the resulting dried product was pulverized, thereby obtaining a carboxymethylated cellulose sodium salt.

The resulting carboxymethylated cellulose sodium salt was dispersed in water to form a water dispersion having a solid content of 1% (w/v). The water dispersion was treated by a high-pressure homogenizer at 140 MPa three times, thereby obtaining a carboxymethylated cellulose nanofiber dispersion. The degree of carboxymethyl substitution and the degree of crystallization of cellulose I type of the resulting cellulose nanofiber were 0.29 and 66%, respectively. The degree of carboxymethyl substitution and the degree of crystallization of cellulose I type were here measured according to the above methods.

The resulting carboxymethylated cellulose nanofibers were dispersed in water to form a dispersion having a solid content of 0.7% by mass, and carboxymethylcellulose (trade name: F350HC-4, viscosity (1%, 25° C., 60 rpm): about 3000 mPa·s, degree of carboxymethyl substitution: about 0.9) was added thereto in an amount of 40% by mass based on the mass of the carboxymethylated cellulose nanofibers (namely, so that the solid content of the carboxymethylcellulose was 40 parts by mass per 100 parts by mass of the solid content of the carboxymethylated cellulose nanofibers), followed by stirring with a TK homomixer (12,000 rpm) for 60 minutes. The pH of the dispersion was about 7 to 8. 0.5% by mass of a sodium hydroxide aqueous solution was added to the dispersion to adjust the pH to 9. Thereafter the surface of a drum of a drum dryer D0405 (manufactured by Katsuragi Industry Co., Ltd.) was coated with the resultant, and the coating was dried at 140° C. for 1 minute. The resulting dried product was scraped, and then pulverized with an impact type mill at a rate of 10 kg per hour, thereby obtaining a dry pulverized product having a water content of 5% by mass. The resulting pulverized product was classified using a 30-mesh sieve, thereby obtaining a powder containing carboxymethylated cellulose nanofibers. The median diameter of the resulting powder was measured according to the above method, and was found to be 92.5 μm. The angle of repose, the collapse angle and the angle of difference were measured according to the above methods, and were found to be 44.6°, 29.3° and 15.3°, respectively. The resulting powder was favorable in workability.

Example 2

A powder containing carboxymethylated cellulose nanofibers was obtained in the same manner as in Example 1 except that the pulverization by the impact type mill was made at a rate of 15 kg per hour to pulverize the dried product. The degree of carboxymethyl substitution and the degree of crystallization of cellulose I type of the carboxymethylated cellulose nanofibers were 0.29 and 66%, respectively. The median diameter of the resulting powder was measured according to the above method, and was found to be 81.5 μm. The angle of repose, the collapse angle and the angle of difference were measured according to the above methods, and found to be were 42.1°, 28.7° and 13.4°, respectively. The resulting powder was favorable in workability.

Example 3

A powder containing carboxymethylated cellulose nanofibers was obtained in the same manner as in Example 1 except that the pulverization by the impact type mill was made at a rate of 20 kg per hour to pulverize the dried product. The degree of carboxymethyl substitution and the degree of crystallization of cellulose I type of the carboxymethylated cellulose nanofibers were 0.29 and 66%, respectively. The median diameter of the resulting powder was measured according to the above method, and was found to be 60.8 μm. The angle of repose, the collapse angle and the angle of difference were measured according to the above methods, and were found to be 41.5°, 27.9° and 13.6°, respectively. The resulting powder was favorable in workability.

Example 4

A powder containing carboxymethylated cellulose nanofibers was obtained in the same manner as in Example 1 except that a solution of 20 parts of sodium hydroxide in 100 parts of water was used instead of a solution obtained by dissolving 20 parts of sodium hydroxide in 10 parts of water and 90 parts of IPA used in a mercerization reaction, and that the amount of IPA added was changed to thereby change the IPA concentration of the reaction liquid in the carboxymethylation reaction to 70%. The degree of carboxymethyl substitution and the degree of crystallization of cellulose I type of the carboxymethylated cellulose nanofibers were 0.28 and 67%, respectively. The resulting powder was favorable in workability.

Example 5

A powder containing carboxymethylated cellulose nanofibers was obtained in the same manner as in Example 1 except that a solution of 20 parts of sodium hydroxide in 100 parts of water was used instead of a solution obtained by dissolving 20 parts of sodium hydroxide in 10 parts of water and 90 parts of IPA used in a mercerization reaction, that the amount of IPA added was changed to thereby change the IPA concentration of the reaction liquid in the carboxymethylation reaction to 70%, and that 233% by mass of dextrin relative to the carboxymethylated cellulose nanofibers was added as the water-soluble polymer instead of carboxymethylcellulose. The degree of carboxymethyl substitution and the degree of crystallization of cellulose I type of the carboxymethylated cellulose nanofibers were 0.28 and 67%, respectively. The median diameter of the resulting powder was measured according to the above method, and was found to be 76.4 μm. The angle of repose, the collapse angle and the angle of difference were measured according to the above methods, and were found to be 35.0°, 18.8° and 16.2°, respectively. The resulting powder was favorable in workability.

The invention claimed is:

1. A powder comprising carboxymethylated cellulose nanofibers, wherein the powder has a median diameter of from 10.0 μm to 150.0 μm, wherein the carboxymethylated cellulose nanofibers have a degree of carboxymethyl substitution of 0.50 or less and a degree of crystallization of cellulose I type of 60% or more and wherein the carboxymethylated cellulose nanofibers exhibit a transmittance to light at a wavelength of 660 nm of 70% or more when the carboxymethylated cellulose nanofibers are dispersed in water to form a water dispersion having a solid content of 1% (w/v).

2. The powder according to claim 1, wherein the powder has an angle of repose in the range from 30.0° to 60.0°.

3. The powder according to claim 2, comprising the carboxymethylated cellulose nanofibers and 5% by mass to 300% by mass of a water-soluble polymer based on an absolute dry mass of the carboxymethylated cellulose nanofibers.

4. The powder according to claim 3, wherein the carboxymethylated cellulose nanofibers are produced by mercerizing a cellulose in a solvent containing mainly water to produce a mercerized cellulose, then carboxymethylating the mercerized cellulose in a mixed solvent of water and an organic solvent to produce a carboxymethylated cellulose, and then defibrating the carboxymethylated cellulose to provide the carboxymethylated cellulose nanofibers.

5. The powder according to claim 4, wherein the solvent containing mainly water is a solvent containing more than 50% by mass of water.

6. The powder according to claim 5, wherein the carboxymethylated cellulose nanofibers have an average fiber diameter of from 3 nm to 500 nm.

7. The powder according to claim 1, comprising the carboxymethylated cellulose nanofibers and 5% by mass to 300% by mass of a water-soluble polymer based on an absolute dry mass of the carboxymethylated cellulose nanofibers.

8. The powder according to claim 1, wherein the carboxymethylated cellulose nanofibers are produced by mercerizing a cellulose in a solvent containing mainly water to produce a mercerized cellulose, then carboxymethylating the mercerized cellulose in a mixed solvent of water and an organic solvent to produce a carboxymethylated cellulose, and then defibrating the carboxymethylated cellulose to provide the carboxymethylated cellulose nanofibers.

9. The powder according to claim 8, wherein the solvent containing mainly water is a solvent containing more than 50% by mass of water.

10. The powder according to claim 1, wherein the carboxymethylated cellulose nanofibers have an average fiber diameter of from 3 nm to 500 nm.

11. The powder according to claim 1, wherein the water dispersion has a transmittance to light at 660 nm of 80% or more.

12. The powder according to claim 1, wherein the water dispersion has a transmittance to light at 660 nm of 90% or more.

\* \* \* \* \*